Patented Jan. 26, 1943

2,309,412

UNITED STATES PATENT OFFICE 2,309,412

EVAPORATION OF CAUSTIC

Irving E. Muskat, Akron, Ohio, assignor to Pittsburgh Plate Glass Company, Allegheny County, Pa., a corporation of Pennsylvania No Drawing. Application December 7, 1939, Serial No. 308,007

1 Claim. (Cl. 23—184)

This invention relates to the evaporation of an aqueous solution of an alkali metal hydroxide such as sodium hydroxide. In the evaporation of such liquors in ordinary evaporators, the solution often becomes seriously contaminated with metallic and other impurities. In addition, the evaporated solution often possesses an undesirable color.

The problem of producing caustic of 70-73 percent concentration of high purity and good color has been particularly difficult since in the past it has been necessary to subject the caustic to purification after concentration to this strength. Since 70-73 percent caustic is solid at atmospheric temperature, the purification of such solutions is conducted at an elevated temperature and is difficult and expensive.

In accordance with my invention I have found that dilute solutions of sodium hydroxide or other alkali metal hydroxide may be evaporated without contamination, and a water-white solution of high concentration and high purity may be secured without recourse to purification of highly concentrated caustic solutions. I have found that alkali metal hydroxide solutions may be concentrated and very pure concentrates secured by conducting the concentration or evaporation in an evaporator, the exposed walls of which are made of carbon or in a carbon container of suitable design. The process may be conducted in a conventional evaporator, which is heated by live steam or other heat exchange liquid, such as diphenyl or diphenyl ether, which is inert to carbon at the evaporating temperature, wherein the heating tubes are of solid carbon or the evaporator may be provided with an interior carbon lining.

By conducting the evaporation in such an evaporator a product of high purity may be secured and purification of the concentrated liquid to remove metallic and other impurities is rendered unnecessary. If the caustic to be evaporated contains undesirable impurities, such as iron compounds, manganese compounds, aluminum compounds, silica, sodium chloride or sodium chlorate, the caustic may be subjected to suitable purification processes prior to evaporation to the final concentration, if desired.

The process is particularly adapted to the production of caustic solutions having a concentration of 65 or more percent and, in general, may be used for the production of solutions containing as much as 75-80 percent or more sodium hydroxide. Dilute liquors containing 5 percent or more of sodium hydroxide may be evaporated in accordance with my invention.

In many cases it is found desirable to concentrate in conventional evaporators to a concentration of 40-50 percent and subject the concentrated solution to purification for the removal of iron, sodium chloride, sodium chlorate, etc. The purified solution may then be further concentrated in carbon evaporators to the desired strength, for example, 70-73 percent. This process is adapted to treatment of purified solutions purified by dialysis. Such solutions are, in many cases, relatively dilute and must be concentrated before they can be sold. In the past such concentration has resulted in contamination and further purification has been required. By evaporating such liquors in accordance with my invention, the second purification may be eliminated.

In one test of my invention electrolytic caustic prepared by a diaphragm type electrolytic cell was evaporated to 45-50 percent by weight and treated to remove iron, sodium chloride and sodium chlorate. The treated liquor was then concentrated in a vacuum evaporator provided with carbon evaporating tubes to a concentration of 73 percent by weight and an uncontaminated water-white product was obtained. The output of the evaporator was about 15 percent greater than that of a similar evaporator equipped with nickel-lined evaporating tubes and the heat required per pound of water evaporated was substantially less than that required by the nickel-lined evaporator. Furthermore, caustic evaporated in the nickel-lined evaporator possessed a poor color and in consequence, was considered objectionable by customers.

Although the present invention has been described in connection with the specific details of certain embodiments thereof, it is not intended that such details shall be regarded as limitations upon the scope of the invention except insofar as included in the accompanying claim.

I claim:

A method of concentrating an aqueous solution of an alkali metal hydroxide having a concentration substantially below 65 percent which comprises the step of heating the solution through a carbon wall for a time sufficient to concentrate the solution to a concentration above 65 percent but not substantially above 75 to 80 percent by weight.

IRVING E. MUSKAT.